United States Patent
Ho et al.

(10) Patent No.: US 11,740,322 B2
(45) Date of Patent: Aug. 29, 2023

(54) HEAD MOUNTED DISPLAY DEVICE AND POSITION DEVICE THEREOF

(71) Applicant: HTC Corporation, Taoyuan (TW)

(72) Inventors: Chia-Chu Ho, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 231 days.

(21) Appl. No.: 17/471,163

(22) Filed: Sep. 10, 2021

(65) Prior Publication Data
US 2023/0080562 A1 Mar. 16, 2023

(51) Int. Cl.
*G01S 5/30* (2006.01)

(52) U.S. Cl.
CPC ...................... *G01S 5/30* (2013.01)

(58) Field of Classification Search
CPC .................. G02B 1/04; G02B 27/01; G02B 2027/0123; G02B 26/0841; G02B 26/101; G02B 27/0101; G02B 5/223; G02B 5/30; G02B 1/14; G02B 5/305; G02B 5/3083; G02B 1/00; G02B 1/002; G02B 3/0081; G02B 3/10; G02B 5/008; G02B 15/14; G02B 21/00; G02B 26/00; G02B 30/00; G02B 27/00; G06V 40/1306; G06V 40/13; G06V 40/1318; G06V 40/1324; G06V 40/16; G06V 40/161; H04N 9/31; H04N 13/341; H04N 13/398; H04N 21/4122; H04N 21/41265; H04N 21/42204; H04N 21/42222; H04N 21/44218; H04N 21/816; H04N 1/387; H04N 1/58; G06F 1/1637; G06F 16/00; G06F 3/0346; G06F 3/0487;

(Continued)

(56) References Cited

U.S. PATENT DOCUMENTS

| 8,269,822 | B2 * | 9/2012 | Zalewski | H04N 13/366 348/56 |
| 8,982,013 | B2 * | 3/2015 | Sako | G02B 27/017 345/156 |
| 9,720,505 | B2 * | 8/2017 | Gribetz | G06F 3/013 |
| 10,088,868 | B1 * | 10/2018 | Hernandez Garcia | G06F 3/011 |

(Continued)

FOREIGN PATENT DOCUMENTS

| TW | 201931354 | 8/2019 |
| TW | 202127105 | 7/2021 |

OTHER PUBLICATIONS

"Office Action of Taiwan Counterpart Application", dated Apr. 14, 2022, p. 1-p. 10.

*Primary Examiner* — Daniel L Murphy
*Assistant Examiner* — Amie M Ndure
(74) *Attorney, Agent, or Firm* — JCIPRNET

(57) ABSTRACT

A head mounted display device and a positioning device thereof are provided. The positioning device includes a first sensor, a second sensor, a third sensor, a first hinge sensor, and a controller. The first sensor and the second sensor have a fixed relative location. The third sensor is disposed on a first flexible member of the head mounted display device. The first hinge sensor is disposed on a first connecting portion configured to connect a main body portion and the first flexible member, wherein the first hinge sensor is configured to sense a first movement state of the first flexible member. The controller is configured to calculate a first relative location information of the first sensor, the second sensor, and the third sensor, and to calibrate the first relative location information according to the first movement state.

11 Claims, 5 Drawing Sheets

(58) Field of Classification Search
CPC ............ G06F 8/70; G06F 9/445; G06F 1/163; G06F 1/1684; G06F 2203/04102; G06F 3/03547; G06F 3/0412; G06F 3/0414; G06F 3/0425; G06F 3/043; G06F 3/0433; G06F 3/0488; G06F 8/654; G03B 21/00; G03B 21/20; G03B 21/2033; G03B 21/204; G03B 21/2053; G03B 21/2086; G03B 21/28; G03B 21/60; G03B 21/62; G01S 5/30; G01S 15/08; G01S 15/18; G01S 15/86; G01S 15/88; G01S 15/89; G01S 15/8925; G01S 7/52026; G01S 7/5205; G01S 7/521; G01R 31/083; G01F 23/284; G01C 21/3635; G01C 21/3644; G01C 21/365; G01V 3/12; G02C 13/003; G09F 11/10; G09F 13/00; G09F 23/00; G09F 27/00; G09F 9/33; H04M 1/026; H04M 1/72454; H04M 2250/12; H04W 24/02; H04W 48/18; H04R 25/554
See application file for complete search history.

(56) References Cited

U.S. PATENT DOCUMENTS

| | | | | |
|---|---|---|---|---|
| 11,127,380 B2* | 9/2021 | Beith | ................ | G02B 27/0172 |
| 2010/0328419 A1* | 12/2010 | Etter | ....................... | H04S 7/303 |
| | | | | 381/306 |
| 2014/0184496 A1* | 7/2014 | Gribetz | ................ | G06F 3/0482 |
| | | | | 345/156 |
| 2018/0088340 A1* | 3/2018 | Amayeh | ............ | G02B 27/0103 |
| 2018/0096503 A1* | 4/2018 | Kaehler | ................ | G06V 40/193 |
| 2018/0137678 A1* | 5/2018 | Kaehler | ................... | G06F 3/012 |
| 2019/0188471 A1* | 6/2019 | Osterhout | ............... | G06F 3/012 |
| 2020/0081120 A1 | 3/2020 | Soldner et al. | | |
| 2021/0183343 A1* | 6/2021 | Beith | ................ | G02B 27/0179 |

* cited by examiner

HEAD MOUNTED DISPLAY DEVICE AND POSITION DEVICE THEREOF

BACKGROUND OF THE INVENTION

Field of the Invention

The invention relates to a head mounted display device and a positioning device thereof, and more particularly to a head mounted display device and a positioning device thereof that may be calibrated according to the body type of the user.

Description of Related Art

With the advancement of electronic techniques, head mounted display devices that may present stereoscopic display effects have become a mainstream.

In order to enhance the user's sense of experience, an external device (such as a handle) may be provided in the electronic system in conjunction with the head mounted display device for interactive operation. In particular, the external device may send ultrasonic signals, and the head mounted display device is equipped with a plurality of sensors to receive the ultrasonic signals sent by the external device, so as to perform a triangulation operation to position the location of the external device.

In the conventional technical field, when the location of at least one of the sensors on the head mounted display device is changed, the triangulation operation performed thereby may cause errors, and thus the location of the external device may not be accurately positioned. As a result, when the user performs interactive operations, which may cause the hands and eyes to be uncoordinated.

SUMMARY OF THE INVENTION

The invention provides a positioning device suitable for a head mounted display device that may calibrate the positioning result according to the body type of the user.

A positioning device of the invention is suitable for a head mounted display device. The positioning device includes a first sensor, a second sensor, a third sensor, a first hinge sensor, and a controller. The first sensor and the second sensor are disposed in a first area of a main body portion of the head mounted display device, wherein the first sensor and the second sensor have fixed relative locations. The third sensor is disposed on a first flexible member of the head mounted display device. The first hinge sensor is disposed on a first connecting portion of the head mounted display device, and configured to connect the main body portion and the first flexible member, wherein the first hinge sensor is configured to sense a first movement state of the first flexible member. The controller is coupled to the first hinge sensor, the first sensor, the second sensor, and the third sensor; the controller is configured to calculate a first relative location information of the first sensor, the second sensor, and the third sensor, and to calibrate the first relative location information according to the first movement state.

A head mounted display device of the invention includes a main body portion, a first flexible member, a first connecting portion, and a positioning device. The first connecting portion is configured to connect the main body portion and the first flexible member. The positioning device includes a first sensor, a second sensor, a third sensor, a first hinge sensor, and a controller. The first sensor and the second sensor are disposed in a first area of the main body portion of the head mounted display device, wherein the first sensor and the second sensor have fixed relative locations. The third sensor is disposed on the first flexible member. The first hinge sensor is disposed on the first connecting portion and configured to sense a first movement state of the first flexible member. The controller is coupled to the first hinge sensor, the first sensor, the second sensor, and the third sensor; the controller is configured to calculate a first relative location information of the first sensor, the second sensor, and the third sensor, and to calibrate the first relative location information according to the first movement state.

Based on the above, the invention provides a hinge sensor disposed on the connecting portion between the flexible members and the main body portion in the head mounted display device for connection. The hinge sensor is made to sense the movement state of the flexible members, and the relative locations of the first sensor, the second sensor, and the third sensor are calibrated via the movement state of the flexible members. In this way, when the flexible members generate different movement information due to different users' wear, the positioning device may effectively correct the relative locations of the first sensor, the second sensor, and the third sensor. When the positioning device detects the location of the external device, the accuracy of the detection result may be effectively maintained.

DESCRIPTION OF THE EMBODIMENTS

Figure 1:
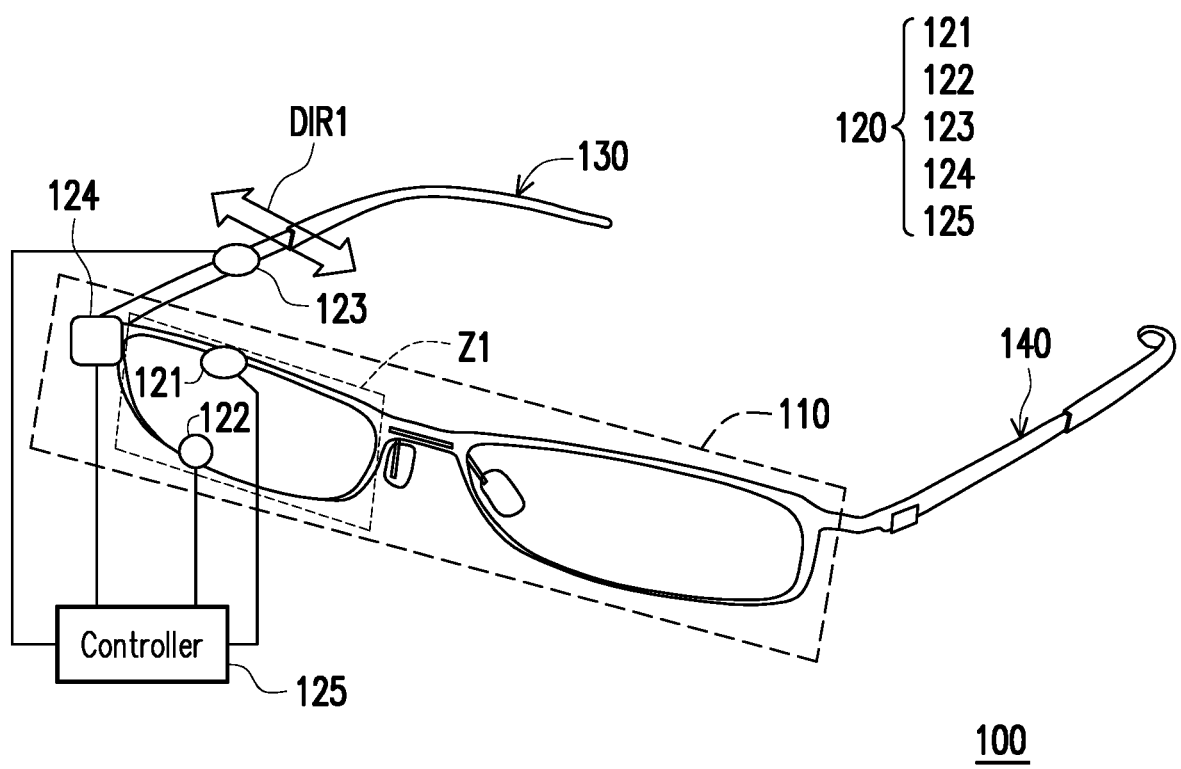
FIG. 1 shows a diagram of a head mounted display device of an embodiment of the invention.

Referring to FIG. 1, FIG. 1 shows a diagram of a head mounted display device of an embodiment of the invention. A head mounted display device 100 is a three-dimensional display device, and may present virtual reality (VR), augmented reality (AR), or mixed reality (MR) display effects. In the present embodiment, the head mounted display device 100 has a main body portion 110, flexible members 130 and 140, and a positioning device 120. In the present embodiment, the main body portion 110 may have a first eye display and a second eye display. The flexible members 130 and 140 are respectively coupled to the first eye display and the second eye display via a first connecting portion and a second connecting portion. In particular, the head mounted display device 100 may be configured in the form of glasses, and the flexible members 130 and 140 may be two temples.

Moreover, the positioning device 120 includes sensors 121 to 123, a hinge sensor 124, and a controller 125. The sensors 121 and 122 are disposed in a first area Z1 in the main body portion 110. For example, the sensors 121 and 122 may be respectively disposed at two different locations above and below the first eye display in the main body portion 110. In particular, the sensor 121 and the sensor 122 have fixed relative locations. In addition, the sensor 123 may be disposed on the flexible member 130. In particular, the sensor 121, the sensor 122, and the sensor 123 may be connected to form one triangle. Moreover, the hinge sensor 124 is disposed on the connecting portion configured to connect the flexible member 130 and the main body portion 110, and is configured to detect the movement state of the flexible member 130.

In addition, the controller 125 is coupled to the sensors 121 to 123 and the hinge sensor 124. In the initial state, the controller 125 may obtain the relative location information between the sensors 121 to 123 according to the preset locations of the sensors 121 to 123. In actual application, the external device (handle) held by the user may send out wireless signals, and the sensors 121 to 123 in the positioning device 125 may respectively receive the wireless signals, and obtain the distance information between the external device and the sensors 121 to 123 according to the strength of the received wireless signals. Then, the controller 125 may perform a triangulation operation according to the distance information, and obtain the location information of the external device.

In the present embodiment, when the user wears the head mounted display device 100, the flexible member 130 used as the temple may be moved in a direction DIR1 due to the difference in the shape of the user's head and/or the size of the user's head. The movement of the flexible member 130 in the direction DIR1 causes the location of the sensor 123 to be different from the original preset location. Here, the hinge sensor 124 may detect the movement state of the flexible member 130. The controller 125 may recalculate the relative locational relationship between the sensors 121 to 123 according to the movement state of the flexible member 130. In this way, according to the relative locational relationship between the sensors 121 to 123 after calibration of the sensors 121 to 123, the positioning device 120 may maintain the accuracy of the positioning action of the external device and maintain the performance of the head mounted display device 100.

In the present embodiment, the sensors 121 to 123 may be ultrasonic receivers configured to receive wireless signals sent by external device that are ultrasonic signals. In other embodiments of the invention, external device may also send other types of wireless signals, and the sensors 121 to 123 may be corresponding wireless signal receivers without certain restrictions.

The controller 125 in the present embodiment may be coupled to the sensors 121 to 123 and the hinge sensor 124 in a wired manner. The controller 125 may be a processor with computing power. Or, the controller 125 may be designed by a hardware description language (HDL) or any other design methods of a digital circuit known to those having ordinary skill in the art, and are hardware circuits implemented by a field programmable gate array (FPGA), complex programmable logic device (CPLD), or application-specific integrated circuit (ASIC).

Figure 2A:
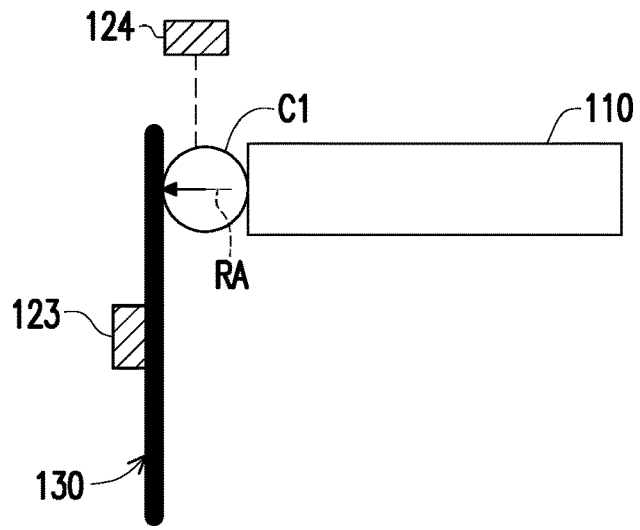
FIG. 2A to FIG. 2C show schematic diagrams of an embodiment of detecting the movement state of a flexible member in an embodiment of the invention.
Figure 2B:
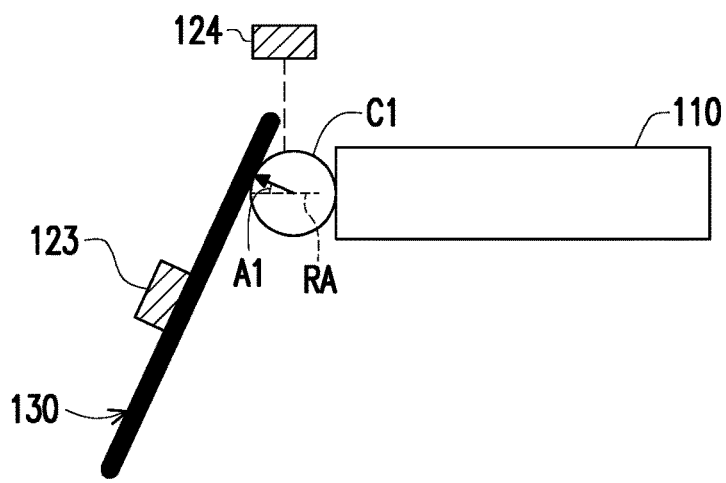
Figure 2C:
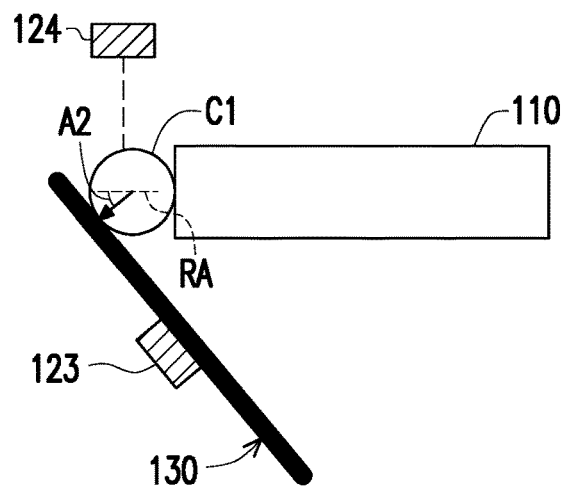

Please refer to FIG. 1 and FIG. 2A to FIG. 2C at the same time hereinafter, wherein FIG. 2A to FIG. 2C show schematic diagrams of an embodiment of detecting the movement state of a flexible member in an embodiment of the invention. In FIG. 2A, the main body portion 110 is connected to the flexible member 130 via a connecting portion C1. The connecting portion C1 may be a rotating shaft and is coupled to the hinge sensor 124. The connecting portion C1 may have a reference axis RA. In FIG. 2A, in the initial state, the reference axis RA of the connecting portion C1 and the normal vector of the flexible member 130 are parallel to each other (the included angle is 0 degrees).

In FIG. 2B, when the flexible member 130 is moved outwardly, the connecting portion C1 may be rotated, and make the reference axis RA and the normal vector of the flexible member 130 in the initial state generate an included angle A1 (wherein the included angle A1 is greater than 0 degrees). At this time, the hinge sensor 124 may obtain the rotation angle of the connecting portion C1 according to the included angle A1. The controller 125 may calculate the movement state of the sensor 123 according to the rotation angle of the connecting portion C1.

For example, the controller 125 may calculate the movement state of the sensor 123 according to the location of the sensor 123 on the flexible member 130 and the included angle A1.

In FIG. 2C, when the flexible member 130 is moved inwardly, the connecting portion C1 may also be rotated, and make the reference axis RA and the normal vector of the flexible member 130 in the initial state generate an included angle A2 (wherein the included angle A2 is less than 0 degrees). At this time, the hinge sensor 124 may obtain the rotation angle of the connecting portion C1 according to the included angle A2. The controller 125 may calculate the movement state of the sensor 123 according to the rotation angle of the connecting portion C1 and the location of the sensor 123 on the flexible member 130.

Figure 3A:
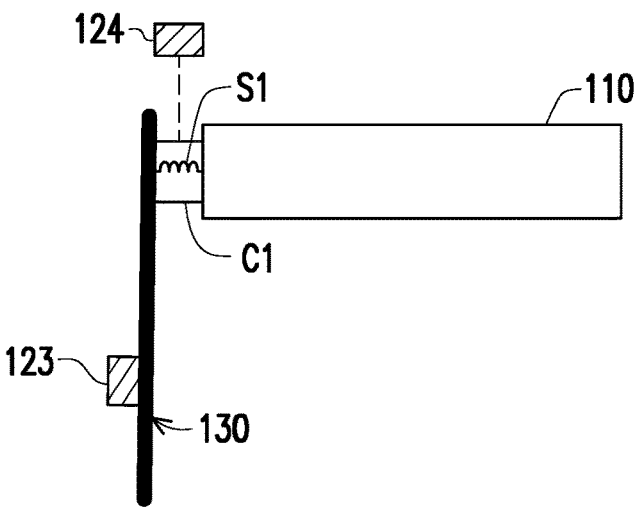
FIG. 3A to FIG. 3C show schematic diagrams of another embodiment of detecting the movement state of a flexible member in an embodiment of the invention.
Figure 3B:
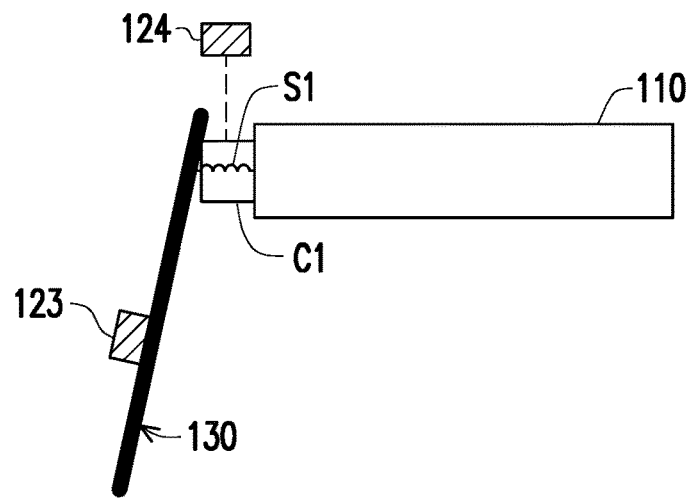
Figure 3C:
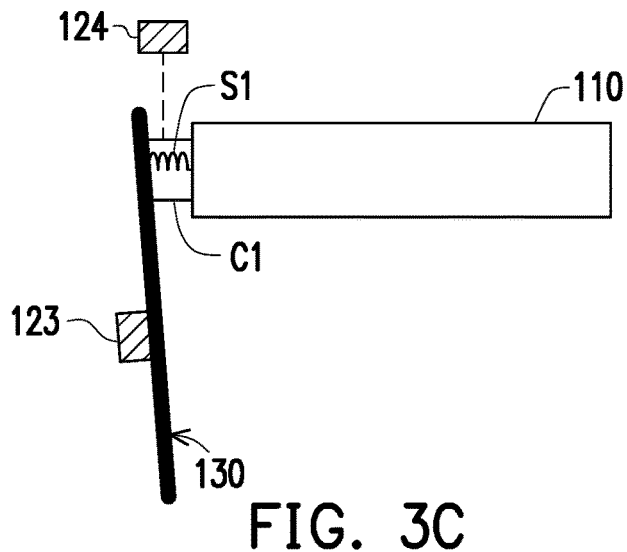

Please refer to FIG. 1 and FIG. 3A to FIG. 3C at the same time hereinafter, wherein FIG. 3A to FIG. 3C show schematic diagrams of another embodiment of detecting the movement state of a flexible member in an embodiment of the invention. In FIG. 3A, the main body portion 110 is connected to the flexible member 130 via the connecting portion C1. The connecting portion C1 has an elastic object S1 and is coupled to the hinge sensor 124 via the elastic object S1. In FIG. 3A, in the initial state, the elastic object S1 of the connecting portion C1 has an initial state.

In FIG. 3B, when the flexible member 130 is moved outwardly, the elastic object S1 may be elongated correspondingly and produce a first deformation state. At this point, the hinge sensor 124 may obtain the rotation angle of the connecting portion C1 according to the first deformation state, and calculate the movement state of the sensor 123 according to the rotation angle of the sensor 123 at the connecting portion C1 and the location of the sensor 123 on the flexible member 130.

In FIG. 3C, when the flexible member 130 is moved inwardly, the elastic object S1 may be compressed correspondingly and produce a second deformation state. At this time, the hinge sensor 124 may obtain the rotation angle of the connecting portion C1 according to the second deformation state. The controller 125 may calculate the movement state of the sensor 123 according to the rotation angle of the connecting portion C1 and the location of the sensor 123 on the flexible member 130.

Figure 4:
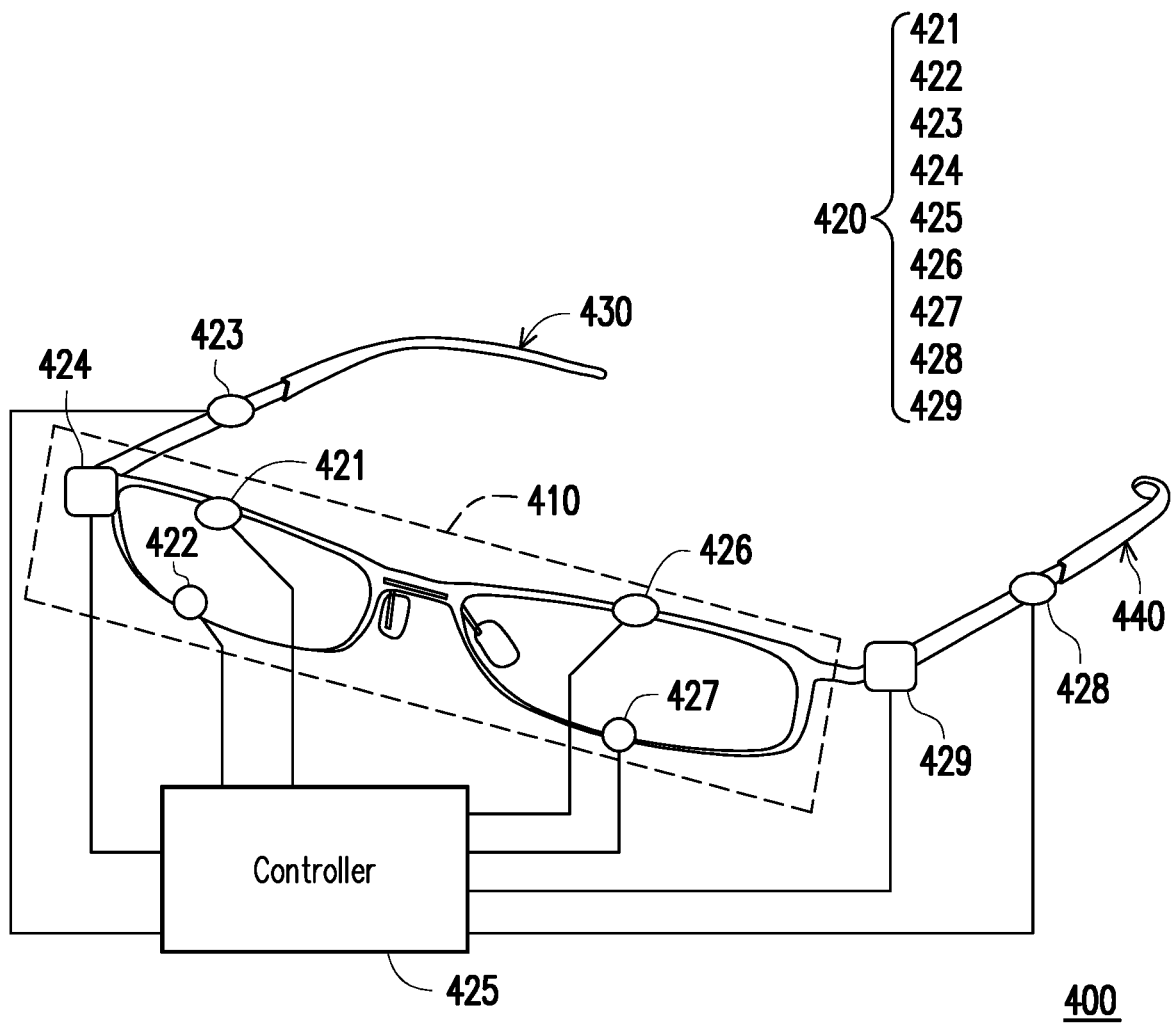
FIG. 4 shows a diagram of a head mounted display device of another embodiment of the invention.

Hereinafter, referring to FIG. 4, FIG. 4 shows a diagram of a head mounted display device of another embodiment of the invention. In the present embodiment, a head mounted display device 400 has a main body portion 410, flexible members 430 and 440, and a positioning device 420. In the present embodiment, the main body portion 410 may have a first eye display and a second eye display. The flexible members 430 and 440 are respectively coupled to the first eye display and the second eye display via a first connecting portion and a second connecting portion. In particular, the head mounted display device 400 may be configured in the form of glasses, and the flexible members 430 and 440 may be two temples.

Moreover, the positioning device 420 includes sensors 421 to 423, 426 to 428, hinge sensors 424 and 429, and a controller 425. The sensors 421 and 422 are disposed in a first area in the main body portion 410. For example, the sensors 421 and 422 may be respectively disposed at two different locations above and below the first eye display in the main body portion 410. In particular, the sensor 421 and the sensor 422 have fixed relative locations. The sensors 426 and 427 may be respectively disposed at two different locations above and below the second eye display in the main body portion 410. In particular, the sensor 426 and the sensor 427 have fixed relative locations.

In addition, the sensors 423 and 428 may be disposed on the flexible members 430 and 440 respectively. In particular, the sensor 421, the sensor 422, and the sensor 423 may be connected to form one triangle, and the sensor 426, the sensor 427, and the sensor 428 may be connected to form another triangle. Moreover, the hinge sensor 424 is disposed on the connecting portion configured to connect the flexible member 430 and the main body portion 410; and the hinge sensor 429 is disposed on the connecting portion configured to connect the flexible member 440 and the main body portion 410. The hinge sensors 424 and 429 are configured to detect the movement states of the flexible member 430 and the flexible member 440, respectively.

The controller 425 is coupled to the sensors 421 to 423, 426 to 428, and the hinge sensors 424 and 429, and configured to perform calculation and calibration actions of the relative location information between the sensors 421 to 423 and the relative location information between the sensors 426 to 428. The controller 425 may be configured to perform a positioning action of an external device.

Regarding the calculation and calibration actions of the relative location information, and the action details of the positioning action of the external device, the above embodiments and implementations are described in detail, and are not repeated herein.

Figure 5:
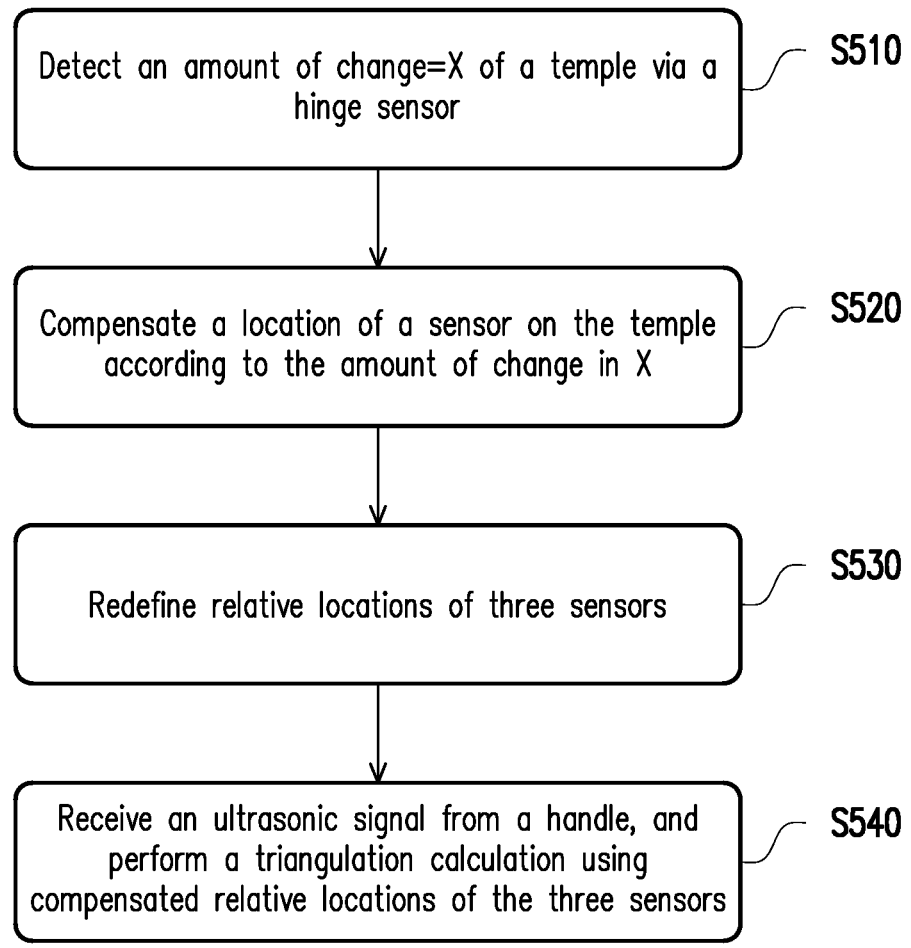
FIG. 5 shows a flowchart of the positioning action of a head mounted display device of an embodiment of the invention.

Referring to FIG. 5, FIG. 5 shows a flowchart of the positioning action of a head mounted display device of an embodiment of the invention. In step S510, in the head mounted display, the hinge sensor on the connecting portion configured to connect the main body portion and a flexible member (temple) detects the amount of change (=X) of the location of the temple. Next, in step S520, the head mounted display device may compensate the location of the sensor disposed on the temple according to the amount of change (=X). Next, in step S530, the head mounted display device may redefine the relative locations of the three sensors on the main body portion and the temple. Moreover, in step S540, the sensor receives the ultrasonic signal transmitted by the handle (external device), and performs a triangulation calculation using the compensated relative locations of the three sensors, thereby positioning the location of the handle.

The implementation details of steps S510 to S540 are described in detail in the above plurality of embodiments and implementations, and are not repeated herein.

Based on the above, in the head mounted display device of the invention, via the hinge sensor disposed on the connecting portion between the main body portion and the flexible members in the positioning device and the movement state of the flexible members, the movement state of the sensor on the flexible members is obtained, and the relative location information between the three sensors in the positioning device is calibrated via the movement state of the sensor on the flexible members. As a result, when the flexible members generate different displacements corresponding to different users, the head mounted display device may maintain the accuracy of the positioning action of the external device, and effectively maintain the performance of the head mounted display device.

What is claimed is:

1. A positioning device, suitable for a head mounted display device, comprising:
    a first sensor and a second sensor disposed in a first area of a main body portion of the head mounted display device, wherein the first sensor and the second sensor have fixed relative locations;
    a third sensor disposed on a first flexible member of the head mounted display device;
    a first hinge sensor disposed on a first connecting portion of the head mounted display device, and configured to connect the main body portion and the first flexible member, wherein the first hinge sensor is configured to sense a first movement state of the first flexible member; and
    a controller coupled to the first hinge sensor, the first sensor, the second sensor, and the third sensor; the controller is configured to calculate a first relative location information of the first sensor, the second sensor, and the third sensor, and to calibrate the first relative location information according to the first movement state.

2. The positioning device of claim 1, wherein the first connecting portion is a rotating shaft, and the first hinge sensor detects a rotation angle of the rotating shaft to generate the first movement state.

3. The positioning device of claim 1, wherein the first connecting portion has an elastic object, and the first hinge sensor detects a deformation state of the elastic object to generate the first movement state.

4. The positioning device of claim 1, wherein the first sensor to the third sensor receive a wireless signal sent by an external device, and the controller positions a location of the external device according to the wireless signal received by the first sensor to the third sensor and the first relative location information.

5. The positioning device of claim 4, wherein the controller positions the external device according to a triangulation operation.

6. The positioning device of claim 1, further comprising:
    a fourth sensor and a fifth sensor disposed in a second area of the main body portion of the head mounted display device, wherein the fourth sensor and the fifth sensor have fixed relative locations;
    a sixth sensor disposed on a second flexible member of the head mounted display device;
    a second hinge sensor disposed on a second connecting portion of the head mounted display device, and configured to connect the main body portion and the second flexible member, wherein the second hinge sensor is configured to sense a second movement state of the second flexible member,
    wherein the controller is coupled to the second hinge sensor, the fourth sensor, the fifth sensor, and the sixth sensor; the controller is configured to calculate a second relative location information of the fourth sensor, the fifth sensor, and the sixth sensor, and to calibrate the second relative location information according to the second movement state.

7. The positioning device of claim 4, wherein the wireless signal sent by the external device is an ultrasonic signal.

8. A head mounted display device, comprising:
    a main body portion;
    a first flexible member;

a first connecting portion configured to connect the main body portion and the first flexible member; and a positioning device, comprising:
- a first sensor and a second sensor disposed in a first area of the main body portion of the head mounted display device, wherein the first sensor and the second sensor have fixed relative locations;
- a third sensor disposed on the first flexible member of the head mounted display device;
- a first hinge sensor disposed on the first connecting portion, wherein the third sensor is configured to sense a first movement state of the first flexible member; and
- a controller coupled to the first hinge sensor, the first sensor, the second sensor, and the third sensor; the controller is configured to calculate a first relative location information of the first sensor, the second sensor, and the third sensor, and to calibrate the first relative location information according to the first movement state.

9. The head mounted display device of claim 8, wherein the first connecting portion is a rotating shaft, and the first hinge sensor detects a rotation angle of the rotating shaft to generate the first movement state.

10. The head mounted display device of claim 8, wherein the first connecting portion has an elastic object, and the first hinge sensor detects a deformation state of the elastic object to generate the first movement state.

11. The head mounted display device of claim 8, wherein the head mounted display device further comprises:
- a second flexible member; and
- a second connecting portion configured to connect the main body portion and the second flexible member;

the positioning device further comprises:
- a fourth sensor and a fifth sensor disposed in a second area of the main body portion, wherein the fourth sensor and the fifth sensor have fixed relative locations;
- a sixth sensor disposed on the second flexible member;
- a second hinge sensor disposed on the second connecting portion, wherein the second hinge sensor is configured to sense a second movement state of the second flexible member, wherein the controller is coupled to the second hinge sensor, the fourth sensor, the fifth sensor, and the sixth sensor; the controller is configured to calculate a second relative location information of the fourth sensor, the fifth sensor, and the sixth sensor, and to calibrate the second relative location information according to the second movement state.

* * * * *